United States Patent [19]

Lindenman

[11] 4,269,146
[45] May 26, 1981

[54] HOG FARROWING HOUSE

[76] Inventor: Charles L. Lindenman, P.O. Box 233, Morland, Kans. 67650

[21] Appl. No.: 79,361

[22] Filed: Sep. 27, 1979

[51] Int. Cl.³ ............................................... A01K 1/02
[52] U.S. Cl. ......................................... 119/16; 119/20
[58] Field of Search .......................... 119/20, 15, 16, 19

[56] References Cited

U.S. PATENT DOCUMENTS

| | | | |
|---|---|---|---|
| 1,371,950 | 3/1921 | Tracy | 119/16 |
| 1,875,433 | 9/1932 | Fitzpatrick | 119/16 |

FOREIGN PATENT DOCUMENTS 635004  3/1950  United Kingdom ...................... 119/16

*Primary Examiner*—Hugh R. Chamblee

*Attorney, Agent, or Firm*—Schmidt, Johnson, Hovey & Williams

[57] ABSTRACT

A hog farrowing house and pen is provided which is especially designed to promote the safety and healthful development of young pigs, and to significantly lower pig mortality. The house and pen structure is relatively compact, can be moved at will, and provides separate areas within both the house and pen for mature sows and pigs. The housing structure includes upright sidewalls and an oblique back wall cooperatively defining a safety zone for pigs which prevents their being smothered or crushed by a nursing sow. The front wall of the house is provided with separate sow and pig doors which lead to separate enclosed pen areas. Shelter for each door is furnished by a forwardly extending wall, and the latter includes a selectively coverable transparent panel above the pig door for presenting a sun-warming area for young pigs.

8 Claims, 5 Drawing Figures

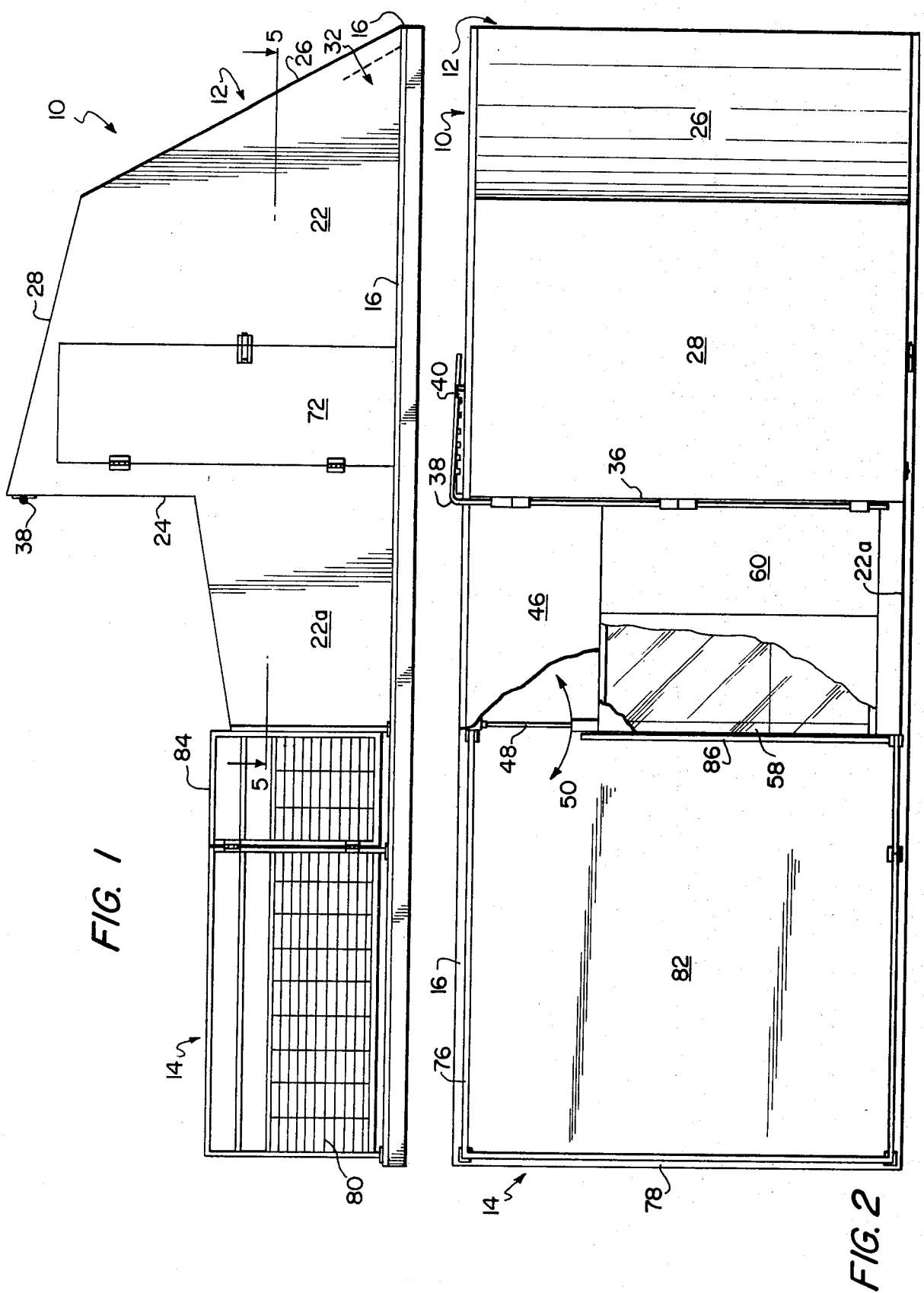

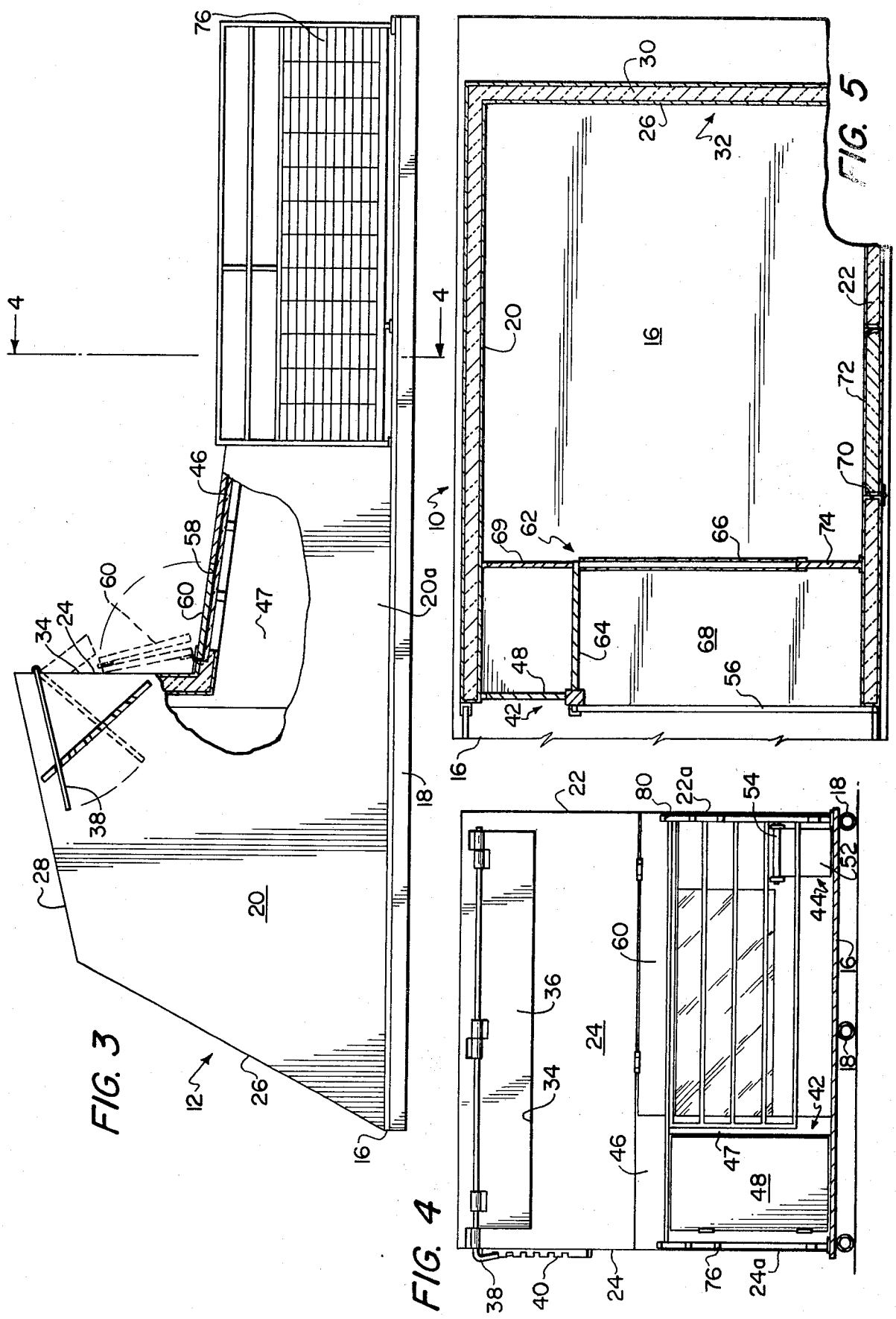

HOG FARROWING HOUSE

BACKGROUND OF THE INVENTION

1. Field of the Invention

The present invention is concerned with hog farrowing houses, and particularly an improved house and pen structure. More particularly, it is concerned with such a house and pen arrangement which is especially designed to minimize pig deaths which commonly result when a litter of pigs is in continual close proximity to a sow.

2. Description of the Prior Art

Farmers have long made it a practice to construct special shelters or houses for sows and pigs, in order to facilitate pig production and maximize the income potential therefrom. A common problem in pig production is that young pigs suffer a high mortality rate, particularly if not protected from the sow. That is to say, it is a common occurrence for sows during nursing to lay upon and crush or smother young pigs. Furthermore, if pigs and sow are enclosed in a relatively small, common area, it often occurs that the sow will step on and kill a number of young pigs. As can be appreciated, unnecessary pig deaths of this type represent a real financial loss to the farmer, particularly when pork prices are relatively high.

A number of attempts have been made in the past to provide a truly effective farrowing house and pen arrangement. Exemplary structures of this type are illustrated in U.S. Pat. Nos. 349,200, 619,688, 670,378, 734,094, 1,230,624, 1,371,950, 1,743,603, 1,750,026, 1,875,433, 2,034,156, 2,712,677, 2,732,826, 3,203,033, 3,216,396, and 3,472,206. However, a truly successful farrowing house and pen structure has not, as far as is known, been produced.

SUMMARY OF THE INVENTION

The present invention is concerned with an improved hog farrowing house and pen structure which overcomes the deficiencies of many prior units of this type and includes a number of novel features designed to maximize the probability of pig survival and healthful development.

To this end, the farrowing house and pen structure of the invention includes a farrowing house having spaced, upright sidewalls, an upright front wall connected to the sidewalls, and an obliquely oriented rear wall likewise connected to the sidewalls which cooperatively presents with the latter a restricted safety zone within the housing structure for protection of young pigs. Thus, during nursing a young pig can escape being crushed or smothered by moving into the restricted access zone of the house, where the bulk of the sow's body cannot reach. The pen assembly is provided adjacent the front wall of the house and includes upright hog-confining fence means forming, with the front of the housing structure, a main hog pen. In addition, upright fence-defining means is provided adjacent a portion of the house front and defines with the latter an enclosed pig pen for young pigs which is separate from the main hog pen. Preferably, the pig pen is in effect a sub-pen of the main hog pen.

Separate hog and pigs access doors are provided through the front wall and respectively communicate the interior of the housing structure with the hog pen and pig pen. Thus, the pigs can move outside the house for sun warming and the like and be safely separate from the sow.

Additional features of the present invention include a forwardly extending cover secured to the housing front wall above the doors for shielding the latter from the effects of the weather. A solar energy transmitting panel is provided in the covering wall, so that the pigs can sit under the panel and be warmed by the sun. A shiftable top cover is provided for selective covering and uncovering of this solar panel as desired.

A creep area is defined within the housing structure by means of upright fence-type barrier. A passageway is provided adjacent the bottom of the barriers for allowing pigs to creep into the protected area, while preventing sows from doing so. Preferably, the exterior pig pen and creep area are in communication via the pig access door. Also, a human entry door is provided in a sidewall of the housing structure, again preferably in communication with the creep area.

BRIEF DESCRIPTION OF THE DRAWINGS

FIG. 1 is a side elevational view of the hog farrowing house and pen of the invention;

FIG. 2 is a plan view thereof, with parts broken away for clarity;

FIG. 3 is a side elevational view with parts broken away for clarity of the side of the house and pen structure opposite to that depicted in FIG. 1;

FIG. 4 is a sectional view taken along line 4—4 of FIG. 3; and

FIG. 5 is a sectional view taken along line 5—5 of FIG. 1 which illustrates the internal construction of the farrowing house.

DESCRIPTION OF THE PREFERRED EMBODIMENT

Turning now to the drawings, a farrowing house and pen 10 is illustrated which broadly includes a specialized farrowing house 12 and a pen assembly 14. The entire unit rests upon and is connected to a substantially solid flooring base 16, and the latter is provided with a plurality of elongated, spaced runners or skids 18 depending from the underside thereof, so as to make the entire unit moveable at will.

In more detail, housing structure 12 includes a pair of upright sidewalls 20, 22 located in laterally spaced relationship, along with an upright front wall 24 and a spaced, obliquely oriented back wall 26 respectively connected to the sidewalls 20, 22. A top wall 28 completes the shell of housing structure 12 and is connected to the aforementioned walls. As best seen in FIG. 5, the defining walls of the structure 12 are insulated where possible, using conventional thermal insulation 30.

The flooring base 16, oblique rear wall 26, and spaced sidewalls 20, 22 cooperatively define an elongated, restricted access safety zone 32 within the structure 12. As will be appreciated from a study of FIGS. 1 and 5, the zone 32 is dimensioned to accommodate a young pig, whereas the bulk of a sow's body makes it impossible for her to fit within the zone 32.

Front wall 24 of housing structure 12 is provided an upper, elongated, rectangular, transversely extending vent opening 34 which is selectively operable by means of a correspondingly configured, shiftable cover 36. An L-shaped operating handle 38 is operatively secured to the cover 36 for selective opening and closing of the latter, and a notched latch bar 40 is mounted on the exterior of sidewall 20 allowing the cover 36 to be latched in any one of a number of desired positions (see the phantom illustration of FIG. 3).

Separate hog and pig access doorways 42, 44 are provided in front wall 24 below the opening 34. As best seen in FIG. 4, a large hog doorway 42 is provided in the leftmost area of the wall 24, whereas a small pig doorway 44 is located at the extreme righthand end of the wall 24. It will be observed in this respect that the doorway 44 is much too small to permit use thereof by a mature hog.

It will be appreciated that the respective doorways 42, 44, are provided with sheltering means for protecting the doorways from the weather. Specifically, a forwardly extending cover wall 46 is secured to the front wall 24 above the respective doorways 42, 44. In addition, respective extensions 20a and 22a extend from the corresponding sidewalls 20, 22 and are connected to and support the cover wall 46. Finally, a short wall 47 spaced from the extension 20a defines a hog passageway therebetween. Thus, the doorways 42, 44 are in effect in a recessed location relative to the forward ends of the wall 46 and extensions 20a, 22a. Hog doors 48 are mounted for pivotal movement about respective upright axes adjacent the outermost and innermost ends of extension 20a and wall 47. The doors can be swung bidirectionally as illustrated by the arrow 50 of FIG. 2, so as to allow a hog to use the doors for both entrance and egress from the housing structure 12. A bidirectional door 52 is mounted over pig doorway 44 and is supported for movement about a horizontal axis by means of a hinged unit 54 secured to front wall 24.

A translucent fiberglass panel 56 is mounted within front wall 24 below the covering wall 46 and between the doorways 42, 44. The purpose of this panel is to admit light and warmth into the housing structure 12, and particularly the creep area thereof which will be described. Additionally, a solar energy-transmitting panel 58 preferably formed of a transparent material is provided in cover wall 46 generally above the panel 56 and doorway 44. A hingedly mounted, two-piece cover 60 is provided for selective covering and uncovering of the panel 58 (see comparative phantom illustration of FIG. 3).

Upright, L-shaped barrier means 62 comprising respective, interconnected fence components 64, 66 is disposed within housing structure 12 adjacent the panel 56. As best seen in FIG. 5, the fence components 64, 66 serve to define a separate rectangular creep area 68 adjacent the panel 56 and in communication with pig doorway 44. Although not specifically illustrated, it will be understood that the fence components 64, 66 are constructed to provide a lowermost restricted passageway therethrough permitting young pigs to pass into the creep area 68 from the main area of housing structure 12; of course, the access passageway is dimensioned so as to prohibit passage of mature hogs into the area 68. A secondary hog doorway 69 is mounted between component 66 and wall 20, and is bidirectionally pivotal about an upright axis as in the case of doors 48, 49.

A human entry doorway 70 and door 72 are provided in sidewall 22. As illustrated in FIG. 5, the end of fence components 66 proximal to door 72 is supported by a post 74 independent of the door 72.

Pen assembly 14 includes three interconnected, elongated, upright fence sections 76, 78 and 80. The sections are interconnected in a generally U-shaped configuration, and the sections 76, 80 are respectively connected to the outermost ends of the wall extensions 20a, 22a. In this manner a hog-confining main pen 82 is cooperatively defined by the fence sections 76, 78 and 80, and the front of the housing structure 12. A conventional human entry gate 84 is provided in fence section 80 for ease of access to the hog pen 82.

The pen assembly further includes upright pig-confining means in the form of a relatively short fence section 86 which extends between the wall 47 and extension wall 22a. Thus, the fence section 86, walls 47, 22a and a portion of the wall 24, define a rectangular pig pen area separate from the hog pen 82. Of course, the pig pen area is in effect a sub-pen of the overall pen assembly which serves to segregate the mature hogs from the young pigs, even when all of the latter choose to remain outside of the housing structure 12.

It will be appreciated from the foregoing description that the house and pen 10 of the present invention provides many advantages for the farmer interested in safe and efficient pig production. These advantages include the following. The height of the housing structure 12 (e.g., eight feet) makes it cooler in the summertime and also makes it more convenient to clean. The preferred solid base prevents drafts from beneath, and also minimizes pig injuries because the baby pigs cannot get their legs caught; this also saves feed since there are no cracks for the feed to fall down through.

The sloping backwall construction leaves the front side of the housing structure the same width as the pen. This eliminates angled corners and permits the pen to be attached to the front of the house. This in turn creates a stronger pen, and allows the overall unit to be moved to provide shelter from winds. In addition, as explained above, the sloping back wall serves to define the safety zone 32 which significantly reduces pig mortality due to crushing and smothering by the sow. The sheltered entrance to the access doors prevents driving rain and blowing snow from getting inside the housing structure; furthermore, a gate latch can be employed with the swinging door 48 in order to keep sows outside when treating pigs within the structure 12.

The small pig door 52 allows the pigs to go into and out of the structure 12 without fear of injury from the sow, and also encourages the baby pigs to go to a sunlit area beneath the panel 58 which is safely away from the sow traffic areas (baby pigs always seek out sunny areas because of warmth). In houses where sunlight only comes through a main hog door, the young pigs tend to congregate in the doorway and can be injured when the sow goes in or out of the house.

The walk in door 72 provided for the farmer allows access to the creep area and makes it possible to handle baby pigs for shots, teeth clipping, etc., without interference from the sow. Also it gives access to get into the housing structure 12 during farrowing.

Having thus described the invention, what is claimed as new and desired to be secured by Letters Patent is:
1. A hog farrowing house and pen, comprising:
housing structure including spaced, upright sidewalls, an upright front wall connected to said sidewalls, an obliquely oriented rear wall spaced from said front wall and connected to said sidewalls to cooperatively present a restricted safety zone within the structure for protection of young pigs;
upright barrier means within said housing structure for defining therewithin a main hog area and an enclosed pig creep area and preventing mature hogs from entering the creep area;

a pen assembly adjacent the front wall of said housing structure and comprising upright hog-confining means forming, with the front of said housing structure, a hog pen outside of said housing structure;

upright young pig-confining means adjacent a portion of said front wall and defining with said front wall portion an enclosed pig pen for young pigs outside of said housing structure which is separate from said hog pen, said pig pen being a sub-pen of said hog pen and including upright partition means extending forwardly from said front wall;

separate hog and pig access doorways through said front wall, on opposite sides of said partition means, and respectively communicating the main hog area of said housing structure with said hog pen, and said creep area with said young pig pen;

a cover wall extending forwardly from said front wall in at least partial covering relationship to said pig pen;

solar energy conveying means located within a portion of said cover wall above said pig pen for allowing young pigs to warm themselves within said pig pen.

2. The hog farrowing house and pen as set forth in claim 1 including means defining an openable vent in said front wall above said access doorways.

3. The hog farrowing house and pen as set forth in claim 1 including a translucent panel formed in said front wall portion adjacent said pig pen.

4. The hog farrowing house and pen as set forth in claim 1 including separate hog and pig doors respectively associated with the corresponding doorways.

5. The hog farrowing house and pen as set forth in claim 1, said cover wall extending over said hog access doorway and defining, with said partition means, a hog passageway leading from said hog access doorway to said hog pen whereby said hog access doorway is recessed relative to the forward end of said partition means.

6. The hog farrowing house and pen as set forth in claim 1 including a flooring base supporting said housing structure and pen assembly.

7. The hog farrowing house and pen as set forth in claim 6 including runners on the underside of said flooring base for rendering the hog farrowing house and pen moveable.

8. The hog farrowing house and pen as set forth in claim 7 including a human entry doorway formed in a sidewall of said housing structure and communicating with said creep area, and a door mounted in said doorway.

* * * * *